(12) United States Patent
Paurola et al.

(10) Patent No.: US 9,470,077 B2
(45) Date of Patent: Oct. 18, 2016

(54) IN SITU COMBUSTION PROCESS WITH REDUCED $CO_2$ EMISSIONS

(75) Inventors: Pentti Paurola, Saint Parthem (FR); Harald Vindspoll, Trondheim (NO); Knut Vebjørn Grande, Trondheim (NO); Karina Heitnes Hofstad, Ranheim (NO)

(73) Assignee: STATOIL ASA, Stavanger (NO)

( * ) Notice: Subject to any disclaimer, the term of this patent is extended or adjusted under 35 U.S.C. 154(b) by 959 days.

(21) Appl. No.: 13/807,227

(22) PCT Filed: Jun. 28, 2011
(Under 37 CFR 1.47)

(86) PCT No.: PCT/EP2011/060847
§ 371 (c)(1),
(2), (4) Date: Nov. 19, 2013

(87) PCT Pub. No.: WO2012/001008
PCT Pub. Date: Jan. 5, 2012

(65) Prior Publication Data
US 2014/0196895 A1 Jul. 17, 2014

(30) Foreign Application Priority Data
Jun. 28, 2010 (GB) .................................. 1010855.3

(51) Int. Cl.
*E21B 43/243* (2006.01)
*E21B 36/02* (2006.01)
(Continued)

(52) U.S. Cl.
CPC ............. *E21B 43/243* (2013.01); *C09K 8/592* (2013.01); *C09K 8/594* (2013.01);
(Continued)

(58) Field of Classification Search
CPC ...... E21B 36/00; E21B 36/008; E21B 36/02; E21B 43/164; E21B 43/24; E21B 43/243; E21B 43/30
USPC ............. 166/258, 260, 256, 272.1, 302, 402
See application file for complete search history.

(56) References Cited

U.S. PATENT DOCUMENTS 3,032,102 A * 5/1962 Parker ................... E21B 43/243
166/250.15
4,410,042 A 10/1983 Shu
(Continued)

FOREIGN PATENT DOCUMENTS

DE 19728151 A1 1/1999
RU 2247830 C2 3/2005
(Continued)

OTHER PUBLICATIONS

Excelsior Energy Limited, "Excelsior Energy Brochure," 2009, 2 pages, http://www.excelsior-energy.com/.
(Continued)

*Primary Examiner* — Kenneth L Thompson
(74) *Attorney, Agent, or Firm* — Birch, Stewart, Kolasch & Birch, LLP

(57) ABSTRACT

The present invention provides a method of recovering a hydrocarbon mixture from a subterranean formation comprising: (i) injecting an oxygen-rich gas into said formation; (ii) combusting said oxygen-rich gas in said formation thereby heating and reducing the viscosity of said hydrocarbon mixture and generating $CO_2$-rich gas; (iii) recovering said heated hydrocarbon; and (iv) capturing at least a portion of $CO_2$ from said $CO_2$-rich gas.

19 Claims, 4 Drawing Sheets

(51) Int. Cl.
*C09K 8/592* (2006.01)
*C09K 8/594* (2006.01)
*E21B 41/00* (2006.01)
*E21B 43/40* (2006.01)
*E21B 43/16* (2006.01)
*E21B 43/38* (2006.01)

(52) U.S. Cl.
CPC ........ *E21B 41/0064* (2013.01); *E21B 43/164* (2013.01); *E21B 43/168* (2013.01); *E21B 43/385* (2013.01); *E21B 43/40* (2013.01); *Y02C 10/14* (2013.01)

(56) References Cited

U.S. PATENT DOCUMENTS

| | | | |
|---|---|---|---|
| 4,415,031 A | | 11/1983 | Hunt, III |
| 4,498,537 A | | 2/1985 | Cook |
| 4,532,991 A | * | 8/1985 | Hoekstra ............... E21B 43/247 166/259 |
| 4,649,997 A | | 3/1987 | Bousiad |
| 4,691,771 A | * | 9/1987 | Ware ....................... E21B 43/30 166/245 |
| 4,818,370 A | * | 4/1989 | Gregoli .................. C10G 9/007 166/256 |
| 5,456,315 A | | 10/1995 | Kisman et al. |
| 5,868,202 A | * | 2/1999 | Hsu ....................... E21B 43/305 166/256 |
| 7,882,893 B2 | * | 2/2011 | Fraim ................... E21B 43/243 166/260 |
| 9,163,491 B2 | * | 10/2015 | Kerr .................... E21B 43/2408 166/245 |
| 2002/0096453 A1 | | 7/2002 | Zaki et al. |
| 2007/0199700 A1 | | 8/2007 | Hocking |
| 2007/0199701 A1 | | 8/2007 | Hocking |
| 2007/0199702 A1 | | 8/2007 | Hocking |
| 2007/0215350 A1 | | 9/2007 | Kresnyak et al. |
| 2009/0100754 A1 | | 4/2009 | Gil |
| 2009/0260809 A1 | * | 10/2009 | Wellington ........... E21B 43/243 166/272.1 |
| 2009/0260825 A1 | * | 10/2009 | Milam .................. E21B 36/025 166/303 |
| 2009/0266540 A1 | * | 10/2009 | De Francesco .......... C10G 1/00 166/261 |
| 2009/0321073 A1 | | 12/2009 | Pfefferle |
| 2010/0206555 A1 | * | 8/2010 | Menard ............... E21B 43/2406 166/245 |
| 2014/0166278 A1 | * | 6/2014 | Kerr .................... E21B 43/2408 166/261 |
| 2015/0345271 A1 | * | 12/2015 | Cochrane ........... E21B 43/2406 166/272.3 |

FOREIGN PATENT DOCUMENTS

| | | |
|---|---|---|
| SU | 1820660 A1 | 3/1995 |
| SU | 1538597 A1 | 5/1999 |
| WO | WO 99/13024 A1 | 3/1999 |
| WO | WO 2010/019657 A1 | 2/2010 |

OTHER PUBLICATIONS

Funk, "Separation of Heavy Oils Using Supercritical Fluids," American Chemical Society National Meeting, Chicago, Sep. 1985, pp. 148-153.
International Preliminary Report on Patentability and Written Opinion of the International Searching Authority for International Application No. PCT/EP2011/060847 issued Dec. 28, 2012 (Forms PCT/IB/373 and PCT/ISA/237).
GB Search Report for 1010855.3 dated Oct. 19, 2010.
International Search Report for PCT/EP2011/060847 dated Sep. 8, 2011.
Written Opinion of the International Searching Authority for PCT/EP2011/060847 dated Sep. 8, 2011.
An English translation of the Russian Notice of Allowance for Application No. 2013013479 dated May 6, 2015.

* cited by examiner

IN SITU COMBUSTION PROCESS WITH REDUCED $CO_2$ EMISSIONS

FIELD OF THE INVENTION

The present invention relates to a method of recovering a hydrocarbon mixture, especially a heavy hydrocarbon mixture, from a subterranean formation by an in situ combustion method using an oxygen-rich gas. An important feature of the method is that at least a portion of $CO_2$ from the $CO_2$-rich gases produced in the combustion process is captured. A preferred feature of the method of the invention is that at least a portion of $CO_2$ from the $CO_2$-rich gases produced in the combustion process is stored in a formation for future use.

BACKGROUND

Heavy hydrocarbons, e.g. bitumen; represent a huge natural source of the world's total potential reserves of oil. Present estimates place the quantity of heavy hydrocarbon reserves at several trillion barrels, more than 5 times the known amount of the conventional, i.e. non-heavy, hydrocarbon reserves. This is partly because heavy hydrocarbons are generally difficult to recover by conventional recovery processes and thus have not been exploited to the same extent as non-heavy hydrocarbons. Heavy hydrocarbons possess very high viscosities and low API (Americal Petroleum Institute) gravities which makes them difficult, if not impossible, to pump in their native state. Additionally heavy hydrocarbons are characterised by high levels of unwanted compounds such as asphaltenes, trace metals and sulphur that need to be processed appropriately during recovery and/or refining.

Some methods have been developed to extract and process heavy hydrocarbon mixtures. The method that is used most often commercially today for heavy hydrocarbon recovery from subterranean reservoirs is steam assisted gravity drainage (SAGD). In this method two horizontal wells are drilled approximately five meters apart then steam is injected into the reservoir through the upper wellbore permeating the oil sand. Steam softens the heavy hydrocarbon (e.g. bitumen) and enables it to flow out of the reservoir and into the lower well. From there it is pumped to the surface facilities. Significant improvements have been made in SAGD processes in recent years, and further optimizations continue to be driven by cost and environmental issues. These improvements include more efficient methods for steam generation and a general, reduction in the steam to bitumen ratio. Both of these improvements are aimed at reducing the amount of steam that needs to be produced which is an energy consuming process that also generates vast amounts of $CO_2$. Another recent development has been the injection of about 10% solvents (sometimes called diluents) with the steam. The idea of this improvement is that the diluent condenses and mixes into the hydrocarbon in the formation and thereby decreases its viscosity and increases its API gravity and thus enhances its recovery.

Nevertheless the SAGD process still suffers from inherent drawbacks. These include:
(i) the use of natural gas for steam generation causes high $CO_2$ emissions
(ii) diluent must still be added to transport the recovered hydrocarbon to refineries users and then separated therefrom. The latter causes $CO_2$ emissions
(iii) asphaltenes are present in the recovered hydrocarbon and their removal at refineries causes yet further $CO_2$ emissions.

Overall the SAGD process leads to the production of vast amounts of $CO_2$ whereas it has already been recognised in the energy industry that $CO_2$ emissions must be managed better. The concentration of $CO_2$ in the Earth's atmosphere has already risen from about 280 to 370 parts per million since the industrial revolution and if current trends are not changed may reach at least twice the preindustrial level by 2100. The possible environmental impact of such a change is well documented.

More recently a number of in situ combustion bitumen recovery processes have been developed and a few of these are in the pilot plant phase. In these methods the injection and production wells are only preheated using steam. Once the oil sands reservoir has been heated to a sufficient ignition temperature, air is injected into the injection wells and ignites to ultimately form a combustion front driving the bitumen recovery. Hot combustion gases contact the bitumen ahead of the combustion zone and heat the bitumen to temperatures greater than about 300 to 400° C. An example of such a process is described in U.S. Pat. No. 5,456,315.

In the method disclosed in U.S. Pat. No. 5,456,315 a row of vertical injection wells are completed in the upper part of the reservoir, at least one gas production well, spaced laterally from the row of injection wells, is also provided and a horizontal production well is positioned below the injection interval. Oxygen-containing gas, typically air, is injected through each injection well and ignites. Initially a discrete combustion chamber exists around the base of each injection well but as combustion proceeds a common combustion chamber forms between each of the injection wells. The combustion zone or area has fronts comprising hot gases that serve to heat up hydrocarbon in their vicinity. This results in the production of heated heavy hydrocarbon of lower viscosity than the native hydrocarbon that drains downwardly through the chamber under the influence of gravity. Thus hydrocarbon is produced from the horizontal production well lying below the injection interval. The gases produced from the in situ combustion flow through the reservoir toward the gas production wells.

This process, however, also suffers from a major disadvantage. Air is the preferred gas for injection into the well to establish and maintain combustion, thus vast quantities of nitrogen-containing compounds including NOx gases are produced in the combustion gases along with $CO_2$. These have to be removed from the gases produced from the gas production wells in order for it to be disposed which is an expensive process. Moreover, as with SAGD, significant volumes of $CO_2$ are simply emitted into the atmosphere.

U.S. Pat. No. 4,410,042 and U.S. Pat. No. 4,498,537 disclose modified in situ combustion methods wherein oxygen or a mixture of oxygen and $CO_2$ is used instead of air as the oxidant for combustion. U.S. Pat. No. 4,410,042 discloses a method wherein combustion is initiated with a mixture of $CO_2$ and $O_2$ but after the combustion front has advanced away from the wellbore, the $CO_2/O_2$ mixture is replaced with pure $O_2$. The method is designed to reduce the risk of ignition in the wellbore. U.S. Pat. No. 4,498,537 discloses a method wherein pure $O_2$ or a $CO_2/O_2$ mixture containing at least 75% $O_2$ is used. It teaches that the use of oxygen or an $O_2/CO_2$ mixture is advantageous because the increased levels of $CO_2$ produced in the reservoir acts as a local pressurising agent as well as a solvent in the oil phase to lower the viscosity of the oil, which together with the thermal effects of combustion, stimulates the reservoir and increases the production of oil.

Compared to the method disclosed in U.S. Pat. No. 5,456,315, however, even greater concentrations of $CO_2$ are produced in the processes of U.S. Pat. No. 4,410,042 and U.S. Pat. No. 4,498,537 and are simply emitted to the atmosphere. As mentioned above, the increase in $CO_2$ levels in the Earth's atmosphere is a growing environmental concern and many options are currently being explored to reduce its production. Considerable attention is, for example, being focussed on energy generation from alternative energy sources such as solar and wind power. However about 85% of the world's present energy needs are still met by burning fossil fuels therefore technologies are still needed that enable hydrocarbons to be recovered and then utilised more efficiently and with lower environmental impact, in particular, with the release of less $CO_2$.

In particular a need exists for recovery processes for hydrocarbon mixtures, and especially heavy hydrocarbon mixtures, that enables the $CO_2$ produced to be managed. In particular, methods are required that reduce the $CO_2$ emitted to the atmosphere compared to currently available techniques. Methods resulting in superior feedstock for delivery to refineries would of course also be advantageous.

The present inventors have devised an in situ combustion process wherein an oxygen-rich gas, for instance, a mixture of oxygen and $CO_2$, is used for the injection that generates and maintains combustion in the reservoir. This generates the hot combustion gases that serve to soften the heavy hydrocarbon and ease its recovery. A $CO_2$-rich atmosphere is simultaneously created during combustion from which the $CO_2$ can easily be captured and optionally recycled and/or stored. Consequently little, if any, $CO_2$ is emitted into the Earth's atmosphere.

SUMMARY OF INVENTION

Thus viewed from a first aspect the present invention provides a method of recovering a hydrocarbon mixture from a subterranean formation comprising:
(i) injecting an oxygen-rich gas into said formation;
(ii) combusting said oxygen-rich gas in said formation thereby heating and reducing the viscosity of said hydrocarbon mixture and generating $CO_2$-rich gas;
(iii) recovering said heated hydrocarbon; and
(iv) capturing at least a portion of $CO_2$ from said $CO_2$-rich gas.

Preferred methods of the invention comprise the further step of:
(va) using said captured $CO_2$ in a method of recovering a hydrocarbon mixture. For instance, the $CO_2$ may be used to form oxygen-rich gas for injection in step (i). Alternatively at least a portion of the captured $CO_2$ may be used in other well treatment processes, e.g. enhanced oil recovery operations.

Particularly preferred methods of the invention comprise the further step of:
(vb) storing at least a portion of the captured $CO_2$ from said $CO_2$-rich gas in a formation.

Viewed from a further aspect the present invention provides the use of an oxygen and $CO_2$ mixture in a method of recovering hydrocarbon from a subterranean formation wherein said oxygen and $CO_2$ mixture is combusted thereby heating and reducing the viscosity of said hydrocarbon and generating a $CO_2$-rich gas, wherein at least a portion of $CO_2$ from said $CO_2$-rich gas is captured.

In a preferred embodiment at least a portion of the captured $CO_2$ is used to form oxygen-rich gas for use in a method of recovering a hydrocarbon mixture.

In a preferred embodiment at least a portion of the captured $CO_2$ from said $CO_2$-rich gas is stored in a formation.

Viewed from a further aspect the invention provides a well arrangement comprising:
(a) a vertical injection well having an inlet for injecting an oxygen-rich gas into a formation;
(b) a substantially horizontal production well for recovering a hydrocarbon mixture; and
(c) a vertical vent well having an outlet for recovering $CO_2$ rich gas; wherein said outlet of said vertical vent well is connected to a $CO_2$ purifier.

DETAILED DESCRIPTION

The methods of the present invention are concerned with the recovery of a hydrocarbon mixture. As used herein, the term "hydrocarbon mixture" is used to refer to a combination of different hydrocarbons, i.e. to a combination of various types of molecules that contain carbon atoms and, in many cases, attached hydrogen atoms. A "hydrocarbon mixture" may comprise a large number of different molecules having a wide range of molecular weights. Generally at least 90% by weight of the hydrocarbon mixture consists of carbon and hydrogen atoms. Up to 10% by weight may be present as sulfur, nitrogen and oxygen as well as metals such as iron, nickel and vanadium (i.e. as measured sulfur, nitrogen, oxygen or metals). These are generally present in the form of impurities of the desired hydrocarbon mixture.

The methods of the present invention are particularly useful in the recovery of heavy hydrocarbon mixtures. A heavy hydrocarbon mixture comprises a greater proportion of hydrocarbons having a higher molecular weight than a relatively lighter hydrocarbon mixture. As used herein a heavy hydrocarbon mixture preferably has an API gravity of less than about 15°, preferably less than 12°, still more preferably less than 10°, e.g. less than 8°. It is particularly preferred if the API gravity of the heavy hydrocarbon mixture to be recovered is from about 5° to about 15°, more preferably from about 6° to about 12°, still more preferably about 7° to about 12°, e.g. about 7.5-9°. Examples of heavy hydrocarbon mixtures that typically have API gravities falling in these ranges are bitumens, tars, oil shales and oil sand deposits.

The methods of the present invention facilitate the recovery of a hydrocarbon mixture and, at the same time, reduce the amount of $CO_2$ emissions associated with recovery of the hydrocarbon compared to conventional processes. The methods of the invention are based on an in situ combustion process wherein a gas is injected into the oil-bearing formation where it combusts with hydrocarbon present therein. A combustion front forms and the area of formation adjacent to the combustion front is heated, therefore the viscosity of any hydrocarbon present in this zone is reduced. As the hydrocarbon softens and becomes flowable, gravity forces it downwards towards a production well from where it can be produced.

In the methods of the present invention, the gas, injected into the formation is an oxygen-rich gas. As used herein, the term "oxygen-rich gas" is used to refer to an oxygen-containing gas comprising at least 25% by volume oxygen and/or $CO_2$. Air, which comprises about 20% by volume oxygen and less than 1% by volume $CO_2$, is not an oxygen rich gas.

A preferred oxygen-rich gas for use in the methods of the present invention comprises at least 25% by volume oxygen. Particularly preferred oxygen-rich gases comprise at least 30% by volume, more preferably at least 40% by volume oxygen. Particularly preferred oxygen-rich gas comprises 25-100% by volume oxygen, more preferably 30-90% by volume oxygen, still more preferably 40-85% by volume oxygen, e.g. about 50 to 80% by volume oxygen or about 50 to 70% by volume oxygen.

In preferred methods of the invention, the oxygen-rich gas additionally comprises $CO_2$. Particularly preferably the oxygen-rich gas consists essentially of (e.g. consists of) oxygen and $CO_2$. Particularly preferably the oxygen-rich gas does not comprise nitrogen or any nitrogen-containing gas, especially nitrogen. Preferably the oxygen-rich gas comprises less than 10% by volume nitrogen, more preferably less than 5% by volume nitrogen, still more preferably less than 2% by volume nitrogen, e.g. less than 1% by volume nitrogen.

In preferred methods of the invention, the oxygen-rich gas comprises at least 5% by volume $CO_2$, more preferably at least 10% by volume $CO_2$ and still more preferably at least 15% by volume $CO_2$. Particularly preferably the amount of $CO_2$ in the oxygen-rich gas is in the range 0-50% by volume, more preferably 5 to 30% by volume, still more preferably 10 to 20% by volume.

Preferably the oxygen-rich gas is an oxygen and $CO_2$ mixture. Preferred oxygen and $CO_2$ mixtures consist of oxygen and $CO_2$. Particularly preferred oxygen and $CO_2$ mixtures comprise 50-95% by volume oxygen and 50-5% by volume $CO_2$, more preferably 60-85% oxygen and 40-15% by volume $CO_2$, still more preferably 70-80% by volume oxygen and 30-20% by volume $CO_2$. An example of a preferred oxygen and $CO_2$ mixture is 60-70% oxygen and 40-30% $CO_2$% by volume.

Particularly preferably the oxygen-rich gas comprises oxygen and $CO_2$ in a ratio of 50:50 to 99:1 by volume, more preferably 70:30 to 95:5 by volume.

In the methods of the present invention the oxygen-rich gas combusts when it is injected into the formation. Preferably the combustion generates a temperature of 300-1000° C., more preferably 500-800° C., still more preferably 600-750° C. in the reservoir. The temperatures achieved in the methods of the present invention are generally higher than the reservoir temperatures achieved using SAGD. This is advantageous because the higher temperatures achieved by the methods of the invention mean that the heavy hydrocarbon is upgraded during the recovery process.

Moreover the reservoir temperatures achieved in the methods of the present invention may advantageously be controlled. Temperature control may be accomplished by varying the flow rate of oxygen injected into the formation and/or by varying the proportion of oxygen present in the oxygen-rich gas that is injected into the formation. Preferably temperature control is achieved by varying both the flow rate of oxygen injected into the formation and the proportions of oxygen and $CO_2$ present in the oxygen-rich gas.

Typically the oxygen-rich gas (e.g. oxygen or an oxygen and $CO_2$ mixture) is injected into the formation at a flow rate that is sufficient to achieve combustion of about 5 to 15% of the hydrocarbon present therein. A decrease in the flow rate of oxygen is expected to decrease the temperature achieved in the reservoir. Additionally, or alternatively, the proportion of oxygen and $CO_2$ present in the oxygen-rich gas may be varied to control the reservoir temperature. Whilst an oxygen-rich gas comprising 100% oxygen would generally be expected to create a reservoir temperature in the region of 800-1000° C., an oxygen-rich gas comprising a 90:10 by volume mixture of oxygen and $CO_2$ would be expected to create a lower reservoir temperature at the same flow rate. The use of $CO_2$ in the oxygen-rich gas thus provides an additional mechanism by which to potentially control reservoir temperature.

Having an ability to control the temperature achieved in the reservoir by combustion is advantageous because it impacts upon the nature of the hydrocarbon mixture produced from the recovery process. Generally the higher the temperature achieved by the combustion in the reservoir the greater the amount of upgrading of hydrocarbon mixture occurs. As used herein, the term "upgrading" generally refers to the process of altering a hydrocarbon mixture to have more desirable properties, e.g. to reduce the average molecular weight of the hydrocarbons present in the mixture and correspondingly its viscosity. Upgrading during the recovery process is therefore generally desirable. In in situ combustion processes, upgrading is believed to occur by thermal cracking. At the same time, however, the temperature of the reservoir needs to be controlled so that the combustion area, as well as the combustion gases, is contained in the part of the formation where they are desired.

An additional factor that may impact upon the extent of upgrading, as well as on overall recovery of hydrocarbon mixture, is the extent to which the oxygen-rich gas injected into the formation mixes with the hydrocarbon. The injection of oxygen within $CO_2$ enables oxygen to be delivered more efficiently throughout the formation and hence may lead to a higher recovery of hydrocarbon.

Additionally at least some of the $CO_2$ present in the oxygen-rich gas may mix with the hydrocarbon present in the formation and thereby decrease its viscosity and increase its API. In other words, the $CO_2$ may function as a diluent. This also leads to a higher recovery of hydrocarbon and may avoid the need for use of other diluents.

The $CO_2$ is believed to dissolve in the hydrocarbon present in the reservoir and thereby act as a solvent lowering the viscosity of the oil. The amount of dissolution depends on a number of factors, e.g. the local formation pressure and temperature, but is nevertheless greater than that experienced when air is used as the oxidant because of the much greater concentration of $CO_2$ produced.

Water is additionally formed in the combustion reaction in the form of steam. It may aid in conveying the heat of combustion further into the formation, further enhancing the effect of the heat achieved. Additionally water may optionally be injected into the formation. If injection of water is carried out, the injection preferably occurs at the same time as injection of oxygen-rich gas.

The oxygen-rich gas injected into the formation may be produced by any method conventional in the art. Oxygen, for instance, may be produced by separation of air into its components using an air separator. Preferably the oxygen used has a purity of at least 95% by volume, preferably at least 97% by volume, still more preferably at least 99% by volume. When present, $CO_2$ may be commercially available $CO_2$, $CO_2$ obtained from the $CO_2$-rich gas resulting from combustion and/or $CO_2$ from carbon storage. Preferably the $CO_2$ used is commercially available $CO_2$ or $CO_2$ obtained from the $CO_2$ rich gas resulting from combustion. Particularly preferably at least a portion of the $CO_2$ used is obtained from the $CO_2$-rich gas resulting from combustion. In other words at least a portion of $CO_2$ is recycled $CO_2$.

The oxygen-rich gas is typically injected into the formation using conventional equipment for the handling of gases. Preferably the oxygen-rich gas is injected into the formation at a pressure less than the fracturing pressure of the formation. Preferably the oxygen-rich gas is injected into the formation at a pressure that is greater than the reservoir pressure. Generally the oxygen-rich gas is injected at a pressure that is 5-20 bar, e.g. about 10 bar, greater than the reservoir pressure. When the oxygen-rich gas comprises a mixture, e.g. of oxygen and $CO_2$, the gases may be mixed prior to injection or co-injected. Preferably the gases are mixed prior to injection.

Prior to the injection of the oxygen-rich gas, the formation is preferably heated. This ensures that ignition and combustion will occur when the oxygen-rich gas is injected. Preferably the formation is heated prior to injection by steam, in particular, by cyclic steam stimulation. Steam may be injected into the formation using conventional techniques. The preheating stage is preferably continued until the reservoir reaches a high enough temperature to maintain combustion. Preferably the preheating step achieves a reservoir temperature of 150-300° C., still more preferably 200-250° C. The generation of steam is, however, an energy consuming and $CO_2$ producing process, therefore the amount of steam used is preferably minimised. The $CO_2$ produced during steam generation may optionally be captured and stored in a formation and/or incorporated into the oxygen-rich gas injected into the formation.

The methods of the present invention may also employ an ignition device. Any commercially available device may be used, e.g. a downhole burner. When present, the ignition device is preferably placed in the injection well. Preferred ignition devices achieve temperatures of at least 300° C., e.g. 300-500° C.

When the formation is sufficiently heated to enable auto-ignition and/or an ignition device (e.g. a downhole burner) is operated, oxygen-rich gas is injected into the formation. Preferably the injection is via at least one injection well, still more preferably via at least one vertical injection well. Preferably the injection wells are drilled though the overburden and completed in the upper portion of the reservoir. By upper portion is meant the upper 50% of the total height of the oil-bearing reservoir. Particularly preferably a plurality of injection wells (e.g. 2, 3, 4 or more) is utilised. When more than one injection well is used, the wells are preferably arranged in a row. Thus after injection is carried out in each well and combustion progresses, a common combustion front will form along the row of wells that subsequently progresses through the formation.

Combustion may be continued until the combustion zone has advanced a certain distance away from the injection well, after which time the combustion is terminated. Termination is typically achieved by stopping the injection of oxygen-rich gas into the formation. The formation may be allowed to soak or it may be put back onto production. If a soak is used, its length will vary depending on the nature of the formation and the wells therein, e.g. the well depth, the rate of production, number of times the well has been stimulated etc. After the soak is completed, the well is put back onto production.

In preferred methods of the invention, the hydrocarbon mixture is produced via a production well, particularly preferably via a substantially horizontal (e.g. horizontal) production well. Preferably the production well is oriented perpendicularly to the injection wells. Preferably the production well is positioned in spaced relation below said injection well. When the injection wells form a row, preferably the production well is located or aligned below the row. Preferably the distance between the bottom of the injection well and the production well is about 2-20 meters, more preferably about 5-10 meters. Preferably the production well is located in the lower portion of the reservoir. By lower portion is meant the lower 50% of the total height of the oil-bearing reservoir. Preferably the production well is fitted with a slotted liner conventional in the art to permit ingress of hydrocarbon mixture from the reservoir. Preferably the hydrocarbon mixture is pumped from the production well to the surface.

In the methods of the present invention, a gas layer forms around and above the bottom of the injection wells. This gas layer comprises uncombusted oxygen-rich gas (e.g. $CO_2$ present in the gas) and the gases produced by combustion, i.e. $CO_2$ and water vapour. Unlike when air is used as the oxidant, the gas layer does not comprise significant amounts of nitrogen or nitrogen containing compounds. The gas present in the gas layer is preferably removed from the formation via at least one vent well, especially at least one vertical vent well. Preferably a plurality, e.g. 2, 3 or more, vent wells are provided. The vent wells are preferably drilled though the overburden and completed in the upper portion of the reservoir. Preferably the vent wells are parallel to the injection wells. Preferably the vent wells are located remotely to (e.g. at least 5 meters away from) the injection wells. Particularly preferably the vent wells are spaced far enough away from the injection wells so that the produced gases are sufficiently cooled prior to arrival at the vent well to avoid damage thereto. If necessary, however, the vent wells may be cooled, e.g. by water circulation. When $CO_2$ is present in the oxygen-rich gas injected into the formation, the majority of unreacted injection gas is $CO_2$ and thus is considerably less dangerous than if oxygen is present in the vent well gas. The vent wells may direct the gases to the surface or to a formation for storage. Preferably the vent wells direct the gases to the surface so they can be treated or conditioned prior to capture and optional storage in a formation.

Thus a particularly preferred method of the invention comprises:
(i) injecting an oxygen-rich gas into said formation via a vertical injection well;
(ii) combusting said oxygen-rich gas in said formation thereby heating and reducing the viscosity of said hydrocarbon mixture and generating $CO_2$-rich gas;
(iiia) recovering said hydrocarbon mixture via a substantially horizontal production well;
(iiib) recovering said $CO_2$ rich gas via a vertical vent well; and
(iv) capturing at least a part of said $CO_2$ from said $CO_2$-rich gas.

Particularly preferred methods of the invention comprise the further step of:
(va) using said captured $CO_2$ in a method of recovering a hydrocarbon mixture, e.g. to form oxygen-rich gas for injection in step (i).

Alternatively at least a portion of the captured $CO_2$ may be used in other well treatment processes, e.g. in enhanced oil recovery methods. For instance the $CO_2$ may be used in a process for simultaneously extracting and upgrading a heavy hydrocarbon mixture as described in WO2011/007172. This process comprises:
i) injecting supercritical or near-supercritical $CO_2$ at a temperature of around the critical temperature and a pressure of around the critical pressure into a heavy hydrocarbon deposit; and ii) removing a stream of $CO_2$ from the deposit, which stream is charged with a hydrocarbon mixture having a lower average molecular weight than that of the heavy hydrocarbon deposit.

Particularly preferred methods of the invention comprise the further step of:

(vb) storing at least a portion of captured $CO_2$ from said $CO_2$-rich gas in a formation.

The $CO_2$-rich gas produced from a vent well preferably comprises at least 50% by volume $CO_2$, more preferably at least 70% by volume $CO_2$, still more preferably at least 80% by volume $CO_2$. The amount of $CO_2$ in the $CO_2$-rich gas is preferably 50-100% by volume, preferably 60-95% by volume, still more preferably 70-90% by volume $CO_2$. The remainder of the gas generally comprises water vapour, SOx and NOx gases and hydrocarbons.

Advantages of the processes of the invention compared to conventional in situ combustion therefore include:

The combustion process in situ yields a gas that is more $CO_2$-rich and which has a significantly lower concentration of NOx gases compared to the gas produced from the combustion of air Sufficiently high levels of $CO_2$ are present in the resulting $CO_2$-rich gas to enable it to be recycled and reinjected into the formation Sufficiently high levels of $CO_2$ are present in the resulting $CO_2$-rich gas to enable $CO_2$ to be captured and stored in an efficient process in a formation for use in the future.

Preferably the $CO_2$-rich gas produced from a vent well is purified prior to reinjection or storage. Particularly preferably the $CO_2$-rich gas is treated to remove water vapour, SOx and NOx gases and other impurities. This may be done by any conventional techniques, e.g. water separation. Preferably the $CO_2$-rich gas is also treated to remove hydrogen and/or hydrocarbons. The removal of hydrocarbon is preferably carried out using a cold-box arrangement or a membrane system.

Preferably the $CO_2$-rich gas produced in the method is captured in a $CO_2$ purifier. The $CO_2$ purifier may be, for example, a $CO_2$ capture apparatus comprising an absorption tower and a regeneration tower. Such towers are conventional in the art. Preferably the $CO_2$-rich gas is contacted, typically in counter flow, with an aqueous absorbent in an absorber column. The gas leaving the absorber column is preferably $CO_2$ depleted and can be released to the atmosphere. The $CO_2$ preferably leaves the absorber column together with the absorbent. Typically the absorbent is subsequently regenerated in a regenerator column and returned to the absorber column. The $CO_2$ separated from the absorbent is preferably sent for reinjection or storage, e.g. in a subterranean formation.

The $CO_2$ obtained is preferably of high purity, e.g. the $CO_2$ may have a purity of 95-100%, e.g. 96-99%. Preferably at least a portion of $CO_2$ from the $CO_2$ rich gas is used to recover a hydrocarbon mixture from a formation. Preferably at least a portion of $CO_2$ from the $CO_2$-rich gas is used to form an oxygen-rich gas for injection in step (i). Preferably a portion of $CO_2$ from said $CO_2$-rich gas is pressurised, condensed and pumped to a formation for storage.

Thus in preferred well arrangements of the present invention, the $CO_2$ purifier is connected to the inlet of said injection well. In further preferred arrangements, the $CO_2$ purifier is connected to a means for transporting $CO_2$ into a formation for storage. Methods for carbon capture and storage are well established in the art and are well known to the skilled man.

The hydrocarbon mixture recovered from the production well preferably has an API of 9-20°, more preferably 10-17°, still more preferably 11-15°. Thus in preferred methods of the invention, the hydrocarbon mixture undergoes upgrading during recovery that increases the API of the hydrocarbon mixture by up to 5°, e.g. by 1 to 5°.

In particularly preferred methods of the invention, the recovered hydrocarbon is deasphalted in a deasphalting unit. Conventional deasphalting techniques may be used. For instance, solvent deasphalting (e.g. with butane or pentane) may be used or the ROSE process may be employed. Alternatively deasphalting may be carried out using supercritical $CO_2$. In this latter case, the $CO_2$ used in the process may be obtained from the $CO_2$-rich gas produced by combustion.

Preferably the deasphalted hydrocarbon has an API in the range 16-25°. Preferably the deasphalted hydrocarbon comprises less than 5% wt, more preferably less than 3% wt, e.g. 0-2% wt asphaltenes. Preferably the sulfur content of the deasphalted hydrocarbon is less than 3% wt, more preferably less than 2.5% wt.

Optionally the deasphalted hydrocarbon is transferred to an upgrading unit to undergo thermal cracking or visbreaking, preferably visbreaking. This step may, for example, be used when the API of the deasphalted hydrocarbon mixture is 16 to 20°. Thermal cracking and/or visbreaking may be carried out by any conventional procedure known in the art. The API of the upgraded product is preferably in the range 18 to 25°. Such a hydrocarbon mixture is transportable, i.e. it can easily be pumped to a refinery for processing.

The asphaltenes recovered in the deasphalting process are preferably combusted in an oxycombustion process. This process generates $CO_2$ that is preferably captured as hereinbefore described. The combustion also generates steam and power. Preferably the steam and power are used in a stimulation process to heat a formation prior to in situ combustion and/or in a SAGD procedure.

DETAILED DESCRIPTION OF PREFERRED EMBODIMENTS

Figure 1A:
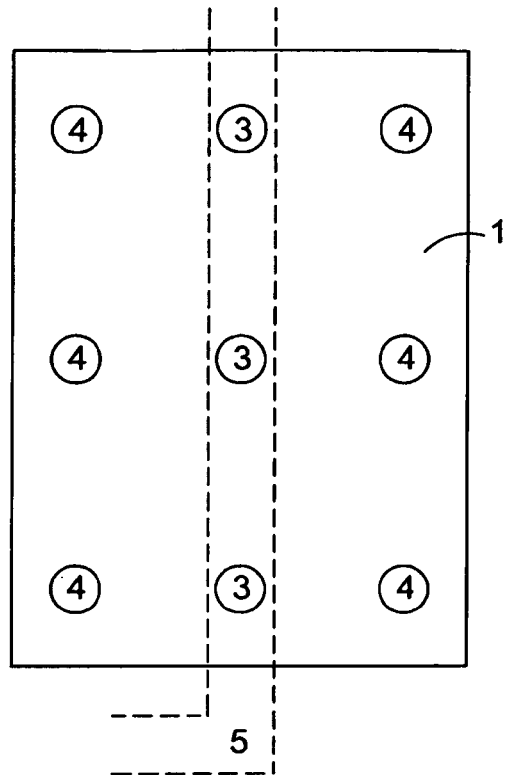
FIGS. 1a and 1b are schematic views of a section of an oil-bearing formation with vertical injection wells, vertical vent wells and a horizontal production well.
Figure 1B:
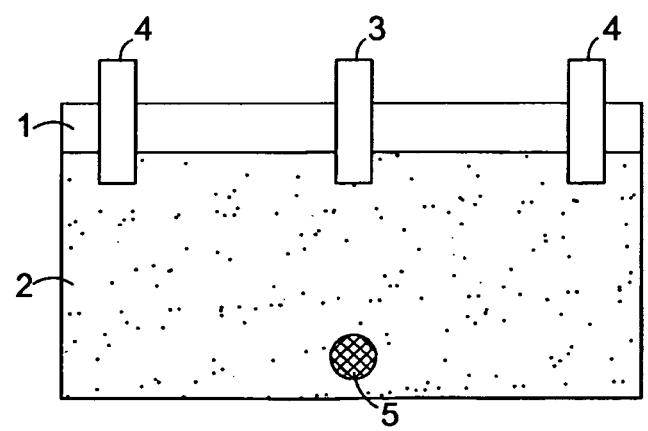

Referring to FIGS. 1a and 1b, they show two views of an oil-bearing formation and the arrangement of wells therein used to carry out the methods of the present invention.

A covering of overburden 1 lies above the oil-bearing formation 2. A row of vertical injection wells 3 are drilled downward through the overburden 1. The injection wells 3 are completed in the oil-bearing formation 2. Vent wells 4 are also drilled through the overburden and are completed in the oil-bearing formation, preferably in an upper portion thereof. Preferably the vent wells 4 are drilled laterally spaced from the injection wells 3 so that the rows of injection wells 3 and rows of vent wells 4 are parallel.

The production well 5 is substantially horizontal and is preferably aligned with, and positioned below, the row of injection wells 3. Preferably the production well is located in a lower region of the oil-bearing formation. The production well is preferably provided with a liner (not shown) as is conventional in the art.

In most cases it will be desirable to preheat the formation prior to commencing in situ combustion. This prepares the cold heavy hydrocarbon for ignition and develops enhanced hydrocarbon mobility in the reservoir. Preheating may be achieved by injecting steam through the injection wells 3 and optionally through the vent wells 4 and/or the production well 5. It is generally desirable to inject steam through all types of wells so fluid communication between the injection well 3, vent well 4 and production well 5 is achieved. Oil may be recovered in production well 5 during this preheating step. When the reservoir is sufficiently heated, combustion may be started.

Figure 2A:
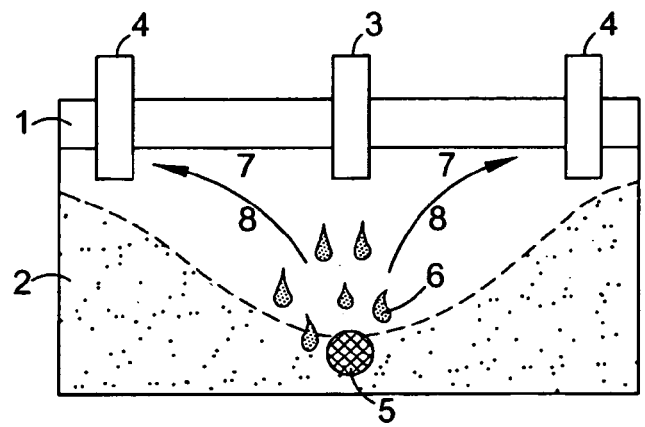
FIGS. 2a and 2b are schematic diagrams of a cross section of the oil-bearing formation perpendicular to the horizontal production well.

Referring to FIG. 2a, it shows a cross-section of an oil-bearing formation in which combustion has begun. Features that are also shown in FIG. 1 are designated by the same reference numeral. Oxygen-rich gas is injected into injection wells 3 to initiate combustion. Thereafter a combustion chamber forms around each injection well 3. The combustion chambers naturally spread and eventually form a continuous chamber that links all of the injection wells 3. The front of the combustion zone heats heavy hydrocarbon in its vicinity thereby increasing the hydrocarbon mobility and enabling it to flow. Under the forces of gravity, the heavy hydrocarbon 6 flows downwards towards production well 5. From there the partially upgraded heavy hydrocarbon is pumped to the surface facilities.

Figure 2B:
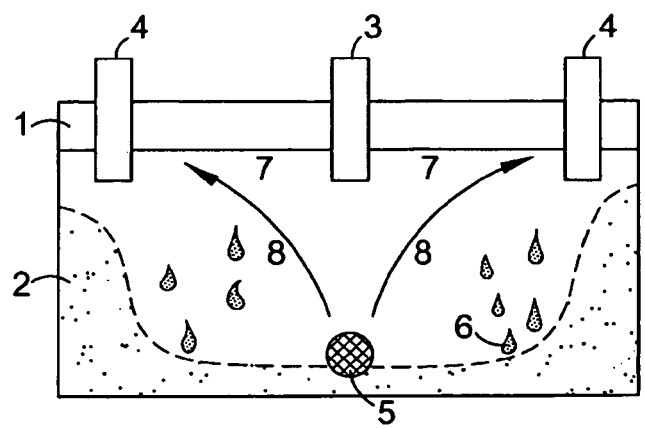

At the start of combustion the combustion front is located very close to the injection wells 3 therefore the heavy hydrocarbon 6 that is heated and recovered is from this portion of the reservoir. As the combustion front spreads, however, heavy hydrocarbon that is located further away from the injection wells becomes sufficiently heated to begin to flow. Thus FIG. 2a shows a cross section of a well shortly after combustion has been initiated and FIG. 2b shows a cross section the same well some time later.

At the same time as combustion, a gas layer 7 forms at the upper surface of the oil-bearing formation. This gas layer comprises highly $CO_2$ rich combustion gases (their flow is represented by arrows 8) as well as $CO_2$ injected as part of the oxygen-rich gas. A small amount of oxygen may also be present in gas layer 7. The gas will establish communication with the vent wells 4. Preferably the $CO_2$-rich gases from the vent wells 4 are captured at the surface where they are treated as discussed below.

After the combustion front has advanced a certain distance from the injection wells, the injection of oxygen rich gas is stopped. This will terminate the in situ combustion process.

Figure 3:
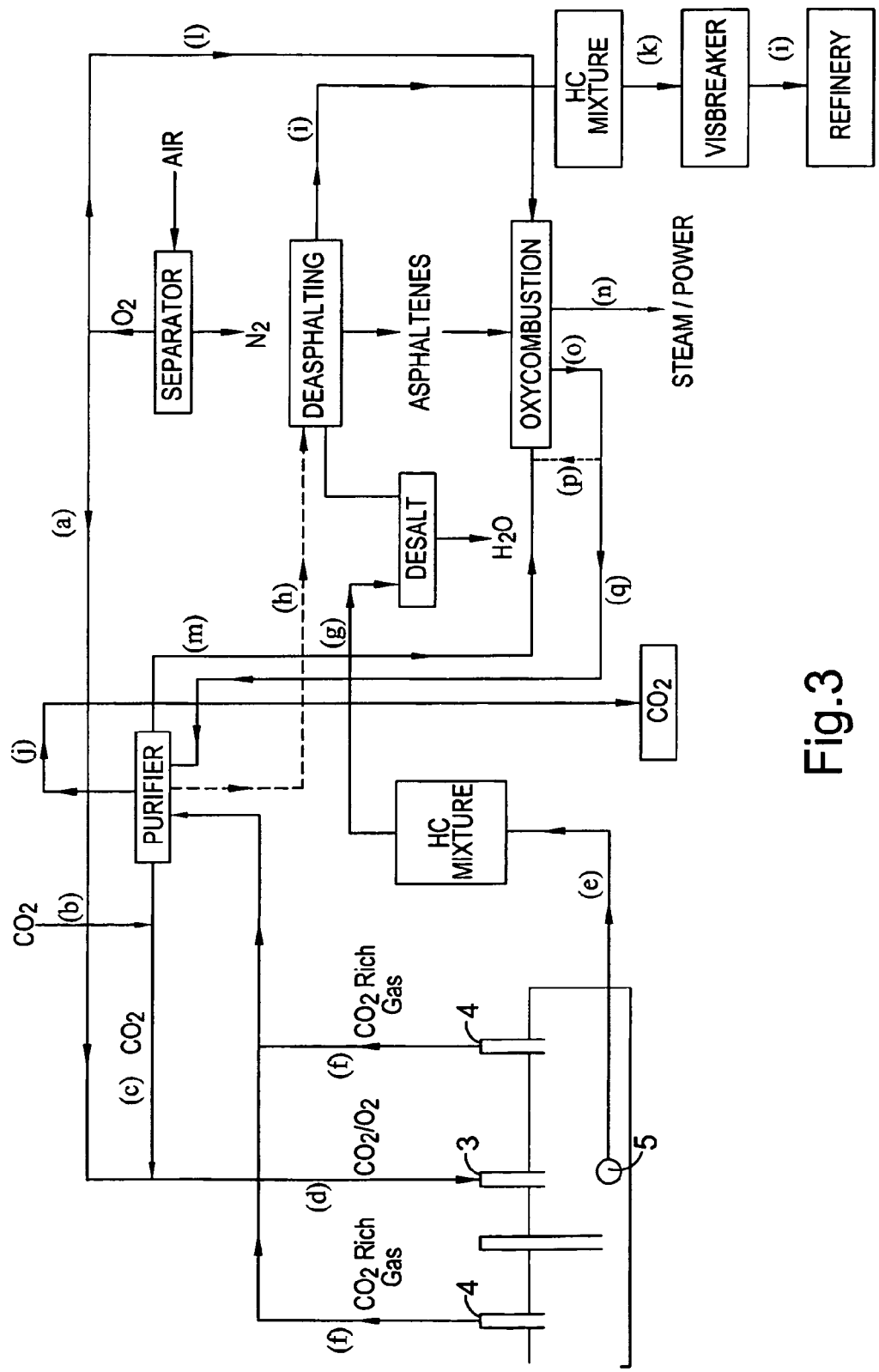
FIG. 3 is a flow diagram of a method of the present invention showing the flow of $CO_2$.

Referring to FIG. 3, it shows the flow of $CO_2$ through a preferred method of the present invention. Oxygen may be prepared by separation from air (arrow a) and combined with $CO_2$ shipped to a platform for carrying out the methods of the invention (arrow b) and/or recycled $CO_2$ from earlier recoveries (arrow c). The oxygen and $CO_2$ mixture is injected into the formation (arrow d) via injection well 3. As described above, this leads to the production of heavy hydrocarbon at production well 5 (arrow e) and $CO_2$ rich gases at vent wells 4 (arrows f).

Typically the heavy hydrocarbon is pumped from production well 5 to the surface. Preferably a water separation is carried out to remove salts (desalting) (arrow g). The heavy hydrocarbon mixture is then preferably routed to a deasphalting unit where asphaltenes are removed therefrom using conventional processes or more preferably by supercritical $CO_2$ processing. If $CO_2$ is produced in this process, the $CO_2$ is preferably captured and recycled and/or stored. When supercritical $CO_2$ processing is used, the $CO_2$ required for the process may be obtained from the $CO_2$-rich gas produced at the vent wells 4 (arrow h). The deasphalted heavy hydrocarbon mixture is routed to a pipeline without diluent, optionally via a visbreaker (arrow k), and then to downstream users (arrow i).

The preferred properties of the heavy hydrocarbon mixture in the formation and the heavy hydrocarbon mixture recovered after deasphalting are shown in the Table below. The table also lists the typical properties of a heavy hydrocarbon mixture obtained by in situ combustion for comparison purposes.

| Parameter | Bitumen | Bitumen from in situ combustion | Bitumen from process of the invention |
|---|---|---|---|
| Viscosity at 20 C. (CP) | >555.000 | 100-1850 | <100 |
| S content (wt %) | 3.2-5 | 2.6-4.0 | 2.2-3.6 |
| API grvity (°) | <7.9 | 10.6-16.2 | 16-21 |
| SARA analysis | | | |
| Volatile organics (wt %) | 15.9 | 25.6 | 28.8 |
| Saturates (wt %) | 25.9 | 23.5 | 26.5 |
| Aromatics (wt %) | 16.6 | 22.6 | 25.5 |
| Resins (wt %) | 12.7 | 17.2 | 19.2 |
| Asphaltenes (wt %) | 28.9 | 11.2 | ~0 |

In a preferred process of the invention, the asphaltenes obtained in the deasphalting process are transferred to an oxycombustion unit, e.g. a plasma treatment chamber where they are burned. Oxygen (arrow l) and $CO_2$ (arrow m) are fed into the unit and the asphaltenes are burned to generate steam and/or power (arrow n). These are preferably used to stimulate a formation prior to in situ combustion and/or in a SAGD process. The exhaust gas from the oxycombustion process is $CO_2$ rich and is preferably collected (arrow o). If it is substantially pure it can be recycled directly into the process (dashed arrow p). Otherwise it is routed to the $CO_2$ purifier (arrow q).

The segregated $CO_2$-rich gases (arrows f) from the production vent wells 4 and optionally from the oxycombustion of asphaltenes (arrow q) are routed to a $CO_2$ purifier. Typically $CO_2$ is separated from the gases. Optionally the gases are conditioned by removing hydrogen and light hydrocarbon components by a conventional cold box arrangement. The enriched $CO_2$ stream (arrow j) can be pressurized, condensed and pumped to available $CO_2$ formation storage sites. Alternatively or additionally the $CO_2$ may be reinjected into the formation as part of the oxygen rich gas (arrow c).

The table below lists the properties of the gases produced at vent wells 4 in a conventional in situ combustion using air as the gas and using an oxygen and $CO_2$ mixture according to the present invention.

| Component (mol %) | Produced gas from in situ combustion | Produced gas from process of the invention |
|---|---|---|
| Hydrogen | 2.23 | 2.23 |
| Oxygen | 0.18 | 0.18 |
| Nitrogen/Nitrogen containing gas | 74.70 | ~0 |

-continued

| Component (mol %) | Produced gas from in situ combustion | Produced gas from process of the invention |
|---|---|---|
| Methane | 4.48 | 4.48 |
| Carbon monoxide | 1.08 | 1.08 |
| Carbon dioxide | 15.81 | 90.51 |
| Hydrocarbons $C_{1-5}$ | 1.13 | 1.13 |
| $H_2S$ | 0.39 | 0.39 |

The methods of the present invention therefore yield a $CO_2$-rich gas that facilitates the capture and recycling or storage of $CO_2$ in a formation.

Figure 4:
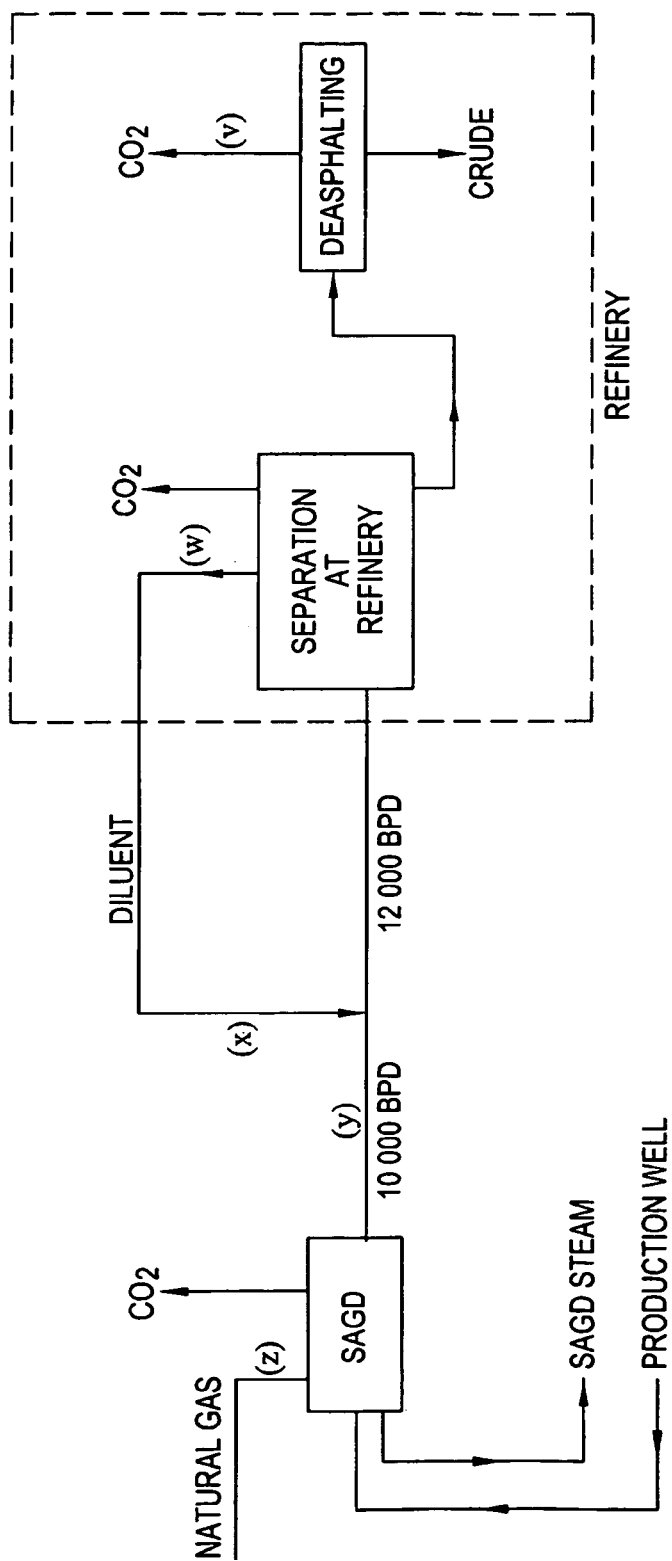
FIG. 4 is a comparative flow diagram for a SAGD method currently in use showing the flow of $CO_2$.

FIG. 4 is a comparative $CO_2$ flow diagram for a SAGD method currently in use. Natural gas is used for the generation of steam (arrow z) and this generates huge quantities of $CO_2$. The recovered heavy hydrocarbon is also too viscous to pump to a refinery because the reservoir temperature achieved in SAGD does not lead to significant upgrading. A diluent must therefore be added (arrow x) to allow the virgin hydrocarbon to be transported. At the refinery, however, the diluent must first be separated from the heavy hydrocarbon (arrow w) and then the asphaltenes from the hydrocarbon (arrow v). Both of these separation processes generate huge volumes of $CO_2$. The refinery also tends to be located remotely to formations and thus a long way from potential $CO_2$ subterranean storage.

The methods of the present invention therefore have numerous advantages over the SAGD process including:
- A significant reduction in water usage for steam generation since steam is only required for a short start up period.
- A significant reduction in natural gas consumption as the methods of the invention use the in situ energy of the heavy hydrocarbon which would otherwise be unrecoverable.
- An elimination of diluent demand as a result of in situ heavy hydrocarbon upgrading and downstream deasphalting.
- An elimination of $CO_2$ emissions because all produced $CO_2$ is recycled and/or compressed, condensed and pumped to a formation which can store $CO_2$ (Carbon Capture and Storage).
- Significantly improved project economics as the heavy hydrocarbon recoveries are estimated to be as much as 50% higher than SAGD recoveries, and capital and operating costs are estimated to be considerably lower than comparable SAGD processes. The beneficial effect of the $CO_2$-rich atmosphere in the reservoir is a further viscosity reduction of heavy hydrocarbon in the swept zone and this translates to more recovery.
- The deasphalted heavy hydrocarbon is a superior feedstock to virgin heavy hydrocarbon from SAGD processes for downstream refineries and less $CO_2$ is generated in the downstream refinery upgrading processes.
- By changing the oxygen:$CO_2$ ratio a desired temperature profile (e.g. between 300-1000° C.) can be created in the reservoir and a more selective upgrading of heavy hydrocarbon will result.

The invention claimed is:

1. A method of recovering a hydrocarbon mixture from a subterranean formation comprising:
   (i) injecting an oxygen-rich gas into said formation;
   (ii) combusting said oxygen-rich gas in said formation thereby heating and reducing the viscosity of said hydrocarbon mixture and generating $CO_2$-rich gas;
   (iii) recovering said heated hydrocarbon mixture and deasphalting said recovered hydrocarbon mixture in a deasphlating unit to produce deasphalted hydrocarbon and asphaltenes;
   (iv) combusting said asphaltenes produced in said deasphalting unit in an oxycombustion process to produce steam, power and $CO_2$-rich gas; and
   (v) capturing at least a portion of $CO_2$ from said $CO_2$-rich gas.

2. A method as claimed in claim 1, comprising the further step of:
   (via) using said captured $CO_2$ in a method of recovering a hydrocarbon mixture.

3. A method as claimed in claim 2, wherein said captured $CO_2$ is used to form oxygen-rich gas for injection in step (i).

4. A method as claimed in claim 1, comprising the further step of:
   (vib) storing at least a portion of $CO_2$ from said $CO_2$-rich gas in a formation.

5. A method as claimed in claim 1, wherein said oxygen-rich gas comprises at least 25% by volume oxygen and/or $CO_2$.

6. A method as claimed in claim 1, wherein said oxygen-rich gas comprises $CO_2$.

7. A method as claimed in claim 1, wherein said oxygen-rich gas comprises at least 30% by volume oxygen.

8. A method as claimed in claim 1, wherein said oxygen-rich gas comprises at least 5% by volume $CO_2$.

9. A method as claimed in claim 1, wherein said formation is heated, e.g. by steam injection, prior to injection of said oxygen-rich gas.

10. A method as claimed in claim 1, comprising
    (i) injecting an oxygen-rich gas into said formation via a vertical injection well;
    (ii) combusting said oxygen-rich gas in said formation thereby heating and reducing the viscosity of said hydrocarbon mixture and generating $CO_2$-rich gas;
    (iiia) recovering said $CO_2$-rich gas via a vertical vent well;
    (iiib) recovering said heated hydrocarbon mixture via a substantially horizontal production well and deasphalting said recovered hydrocarbon mixture in a deasphalting unit to produce deasphalted hydrocarbon and asphaltenes;
    (iv) combusting said asphaltenes produced in said deasphalting unit in an oxycombustion process to produce steam, power and $CO_2$-rich gas; and
    (v) capturing at least a portion of $CO_2$ from said $CO_2$-rich gas.

11. A method as claimed in claim 1, wherein said $CO_2$-rich gas comprises at least 70% by volume $CO_2$.

12. A method as claimed in claim 1, wherein said recovered hydrocarbon mixture has an API of 10-17°.

13. A method as claimed in claim 1, wherein said deasphalted hydrocarbon mixture has an API in the range 16-25°.

14. A method of recovering a hydrocarbon mixture from a subterranean formation, comprising the steps of:
    combusting an oxygen and $CO_2$ mixture in said formation thereby heating and reducing the viscosity of said hydrocarbon mixture and generating a $CO_2$-rich gas;
    recovering said heated hydrocarbon mixture;
    deasphalting said recovered hydrocarbon mixture in a deasphalting unit to produce desasphalted hydrocarbon and asphaltenes;
    combusting said asphaltenes produced in said deasphalting unit in an oxycombustion process to produce steam, power and $CO_2$-rich gas; and
    capturing at least a portion of $CO_2$ from said $CO_2$-rich gas.

15. A method as claimed in claim 14, wherein at least a portion of $CO_2$ from said $CO_2$-rich gas is used in a method of recovering a hydrocarbon mixture.

16. A method as claimed in claim 14, wherein at least a portion of $CO_2$ from said $CO_2$-rich gas is stored in a formation.

17. A well arrangement comprising:
(a) a vertical injection well having an inlet for injecting an oxygen-rich gas into a formation;
(b) a substantially horizontal production well for recovering a hydrocarbon mixture; and
(c) a vertical vent well having an outlet for recovering $CO_2$ rich gas;
wherein said outlet of said vertical vent well is connected to a $CO_2$ purifier.

18. A well arrangement as claimed in claim 17, wherein said $CO_2$ purifier is connected to said inlet of said injection well.

19. A well arrangement as claimed in claim 17, wherein said $CO_2$ purifier is connected to a means for transporting $CO_2$ into a formation for storage.

* * * * *